United States Patent [19]

Schmidt et al.

[11] Patent Number: 5,106,049
[45] Date of Patent: Apr. 21, 1992

[54] VEHICLE MOUNTING ASSEMBLY

[76] Inventors: William P. Schmidt, 21000 Woodruff, Rockwood, Mich. 48173; Franklin D. Hutchinson, 28000 Beel Rd., New Boston, Mich. 48164

[21] Appl. No.: 419,213

[22] Filed: Oct. 10, 1989

[51] Int. Cl.$^5$ .................................................. B60R 1/00
[52] U.S. Cl. ..................................... 248/487; 296/152
[58] Field of Search ................ 248/487, 476, 475.1; 296/152; 350/606, 631, 632, 634

[56] References Cited

U.S. PATENT DOCUMENTS

| | | | |
|---|---|---|---|
| 3,667,718 | 6/1972 | Goslin et al. | 248/487 |
| 3,729,163 | 4/1973 | Cummins | 248/487 |
| 3,778,016 | 12/1973 | Gernhardt et al. | 248/475.1 |
| 3,833,198 | 9/1974 | Holzman | 248/476 |
| 3,857,539 | 12/1974 | Kavanaugh | 248/475.1 X |
| 4,368,868 | 1/1983 | Urban | 248/475.1 X |
| 4,500,063 | 2/1985 | Schmidt et al. | 248/475.1 |
| 4,830,326 | 5/1989 | Schmidt et al. | 350/632 X |
| 5,005,963 | 4/1991 | Schmidt et al. | 350/631 X |

*Primary Examiner*—David L. Talbott
*Attorney, Agent, or Firm*—Weintraub, DuRoss & Brady

[57] ABSTRACT

The mounting assembly readily enables longitudinal or transverse adjustment of the position of the mirror relative to the vehicle. The mounting assembly includes a mirror shaft, a base member and a cover member to secure the upper end of the mirror shaft to the back of the mirror; a pair of anchors and sleeves which anchor the medial portion of the mirror shaft to the vehicle, and a clamping member and a bracket member to mount the lower end of the mirror shaft to the vehicle. The mirror shaft is secured within the clamping member, the clamping member is mounted onto the bracket member, and the bracket member is mounted onto the vehicle. The base member is secured to the back of the mirror, and the upper end of the mirror shaft is securely retained between the cover member and the base member. Two elongated anchors are cooperatively engaged with two sleeves which are medially disposed about the mirror shaft. One end of each anchor is securely affixable to the vehicle, and the second end of each anchor is securely affixable to the sleeve which surround the mirror shaft.

21 Claims, 4 Drawing Sheets

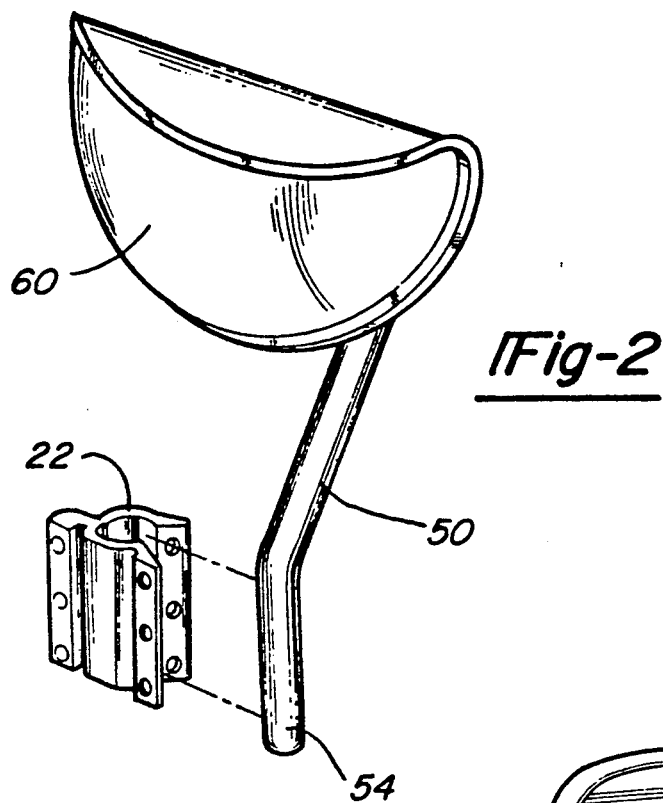
_Fig-2_
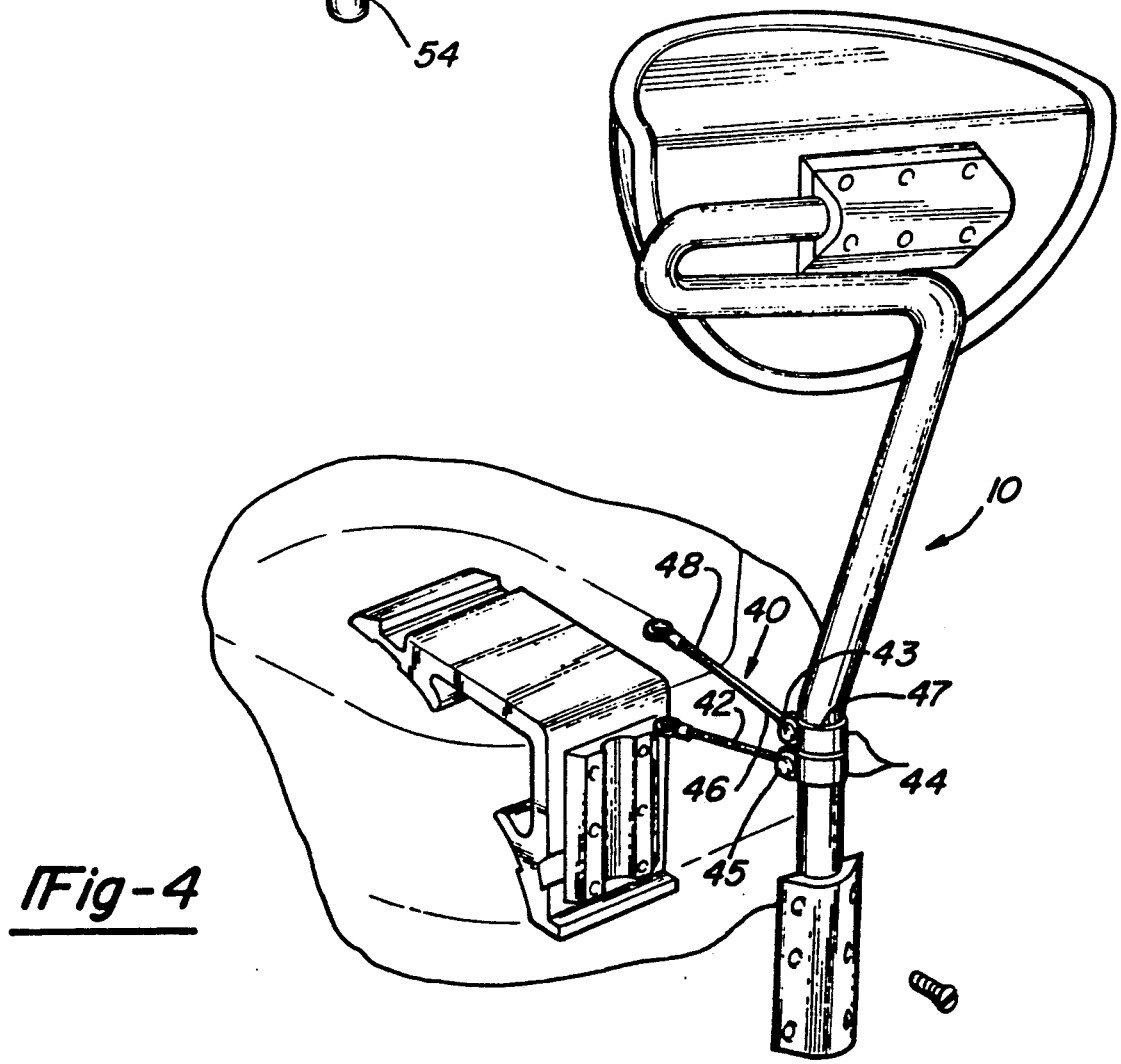
_Fig-4_

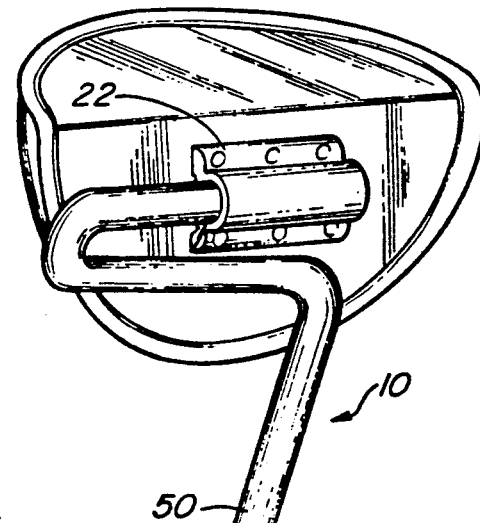
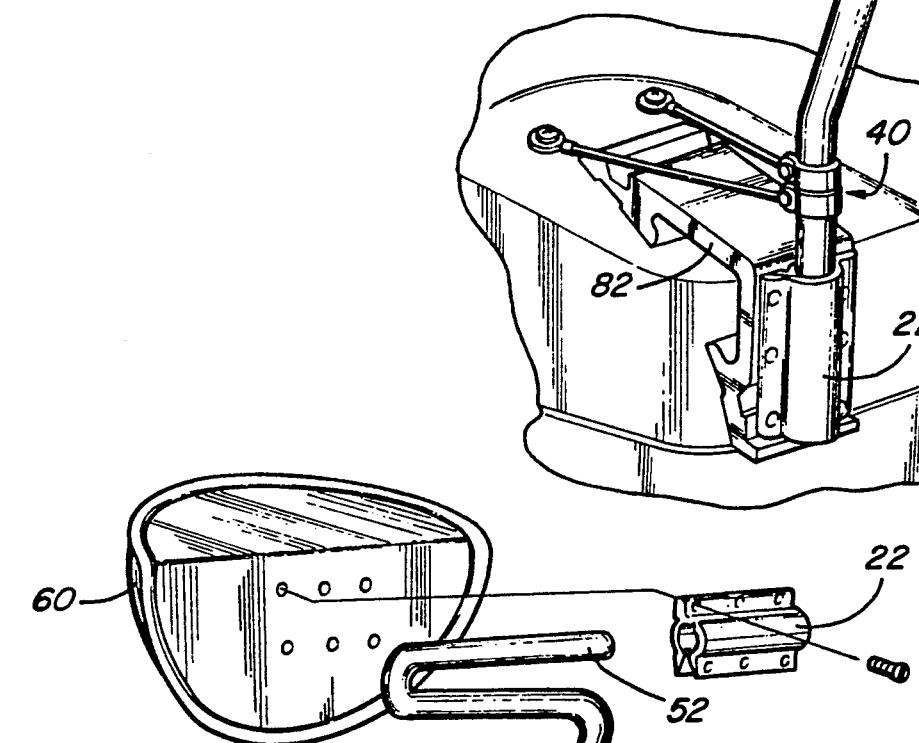
Fig-5
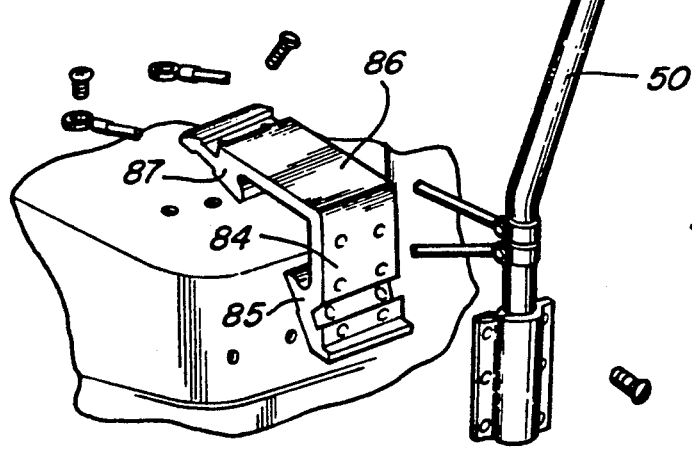
Fig-6

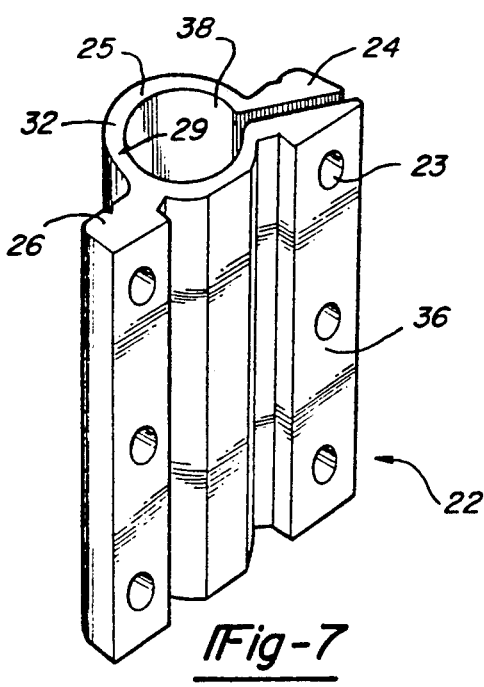 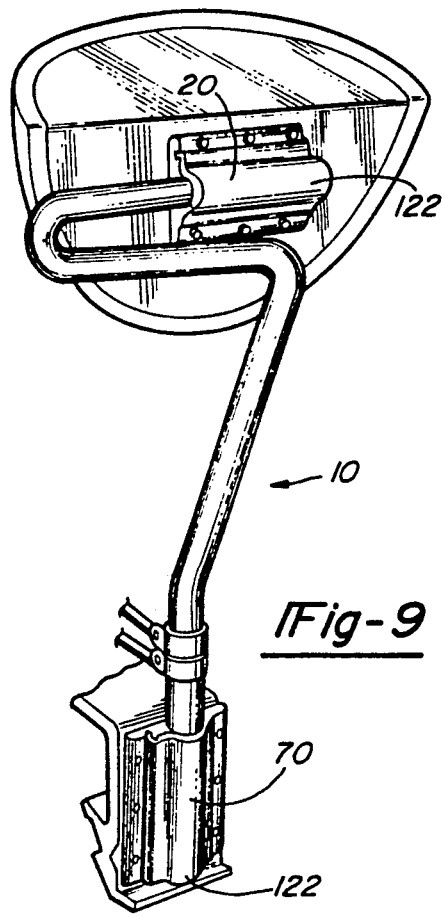 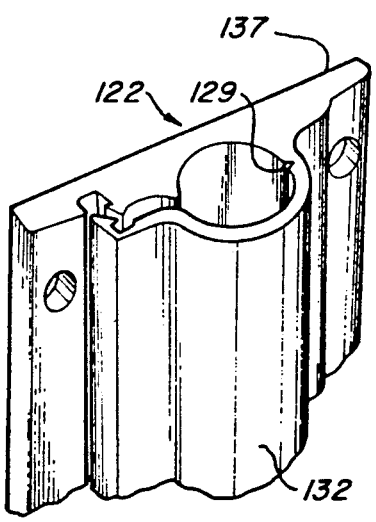 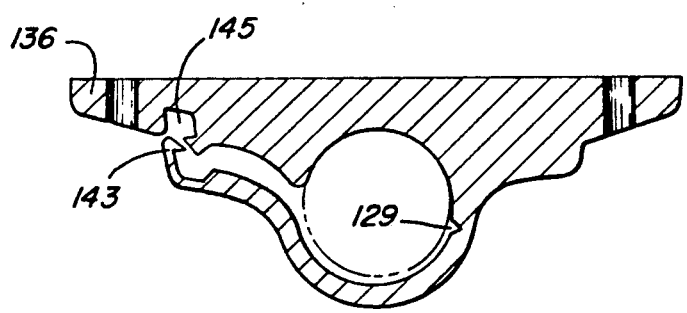 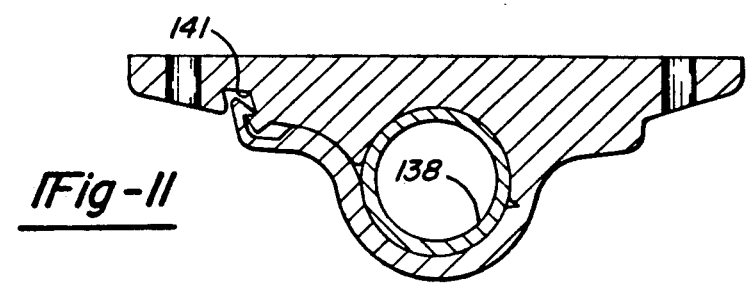

VEHICLE MOUNTING ASSEMBLY

FIELD OF THE INVENTION

The present invention relates to a vehicle mounting assembly to be used for securing mirrors to motor vehicles, and more particularly, to large trucks and buses.

BACKGROUND OF THE INVENTION

A rear view mirror must enhance the field-of-view of the driver about the vehicle. However, chronic mirror vibration can make even the best reflective surface ineffective. Since it is generally preferred that the mirror extend above the front of the vehicle so that the driver can (1) view objects in front of the vehicle, and (2) easily locate the mirror, the mirror mounting essembly is generally elongated, and the likelihood of chronic mirror vibration is enhanced. Numerous mirror mounting supports are known for securing the mirror to the vehicle.

U.S. Pat. No. 1,932,873 discloses a support for a rearview mirror positioned on the side of a truck which can be laterally and vertically adjusted to the desired position, which is capable of firmly holding the mirror in the adjusted angular position. U.S. Pat. No. 3,395,883 discloses a detachable fender mounted rear view mirror having a tripodal frame and a Y-shaped clamp designed to minimize mirror vibration. The mirror assembly involves no fasteners to enable a rapid mounting. U.S. Pat. No. 4,500,063 discloses a fender mount for a rear view mirror attachable to the curved portion of the vehicle fender. The fender mount includes a base member attached to the fender and a cover member which secures the lower portion of the tubular shaft to the base member.

A mirror mounting assembly must not only enables ready adjustment of the orientation of the mirror to accommodate drivers of varying sizes, but also securely affix the mirror to the vehicle to minimize mirror vibration. While traveling at high speeds, the driver is highly dependent upon the rear view mirrors to locate objects approaching the vehicle from both sides and the rear. If the mirror mounting assembly does not securely affix the mirror to the vehicle allowing unnecessary mirror vibration, the utility of the mirror is diminished, and public safety is compromised.

What is needed is a mirror mounting assembly for larger vehicles which readily enables longitudinal or transverse adjustment of the position of the mirror relative to the vehicle, and minimizes vibration of the mirror relative to the vehicle.

SUMMARY OF THE INVENTION

The mounting assembly of the present invention preferably includes a mirror shaft, an upper clamping member to secure the upper end of the mirror shaft to the back of the mirror, a pair of anchors and sleeves which anchor the medial portion of the mirror shaft to the vehicle, a lower clamping member, and a bracket member to mount the lower clamping member to the vehicle.

The lower clamping member has an elongated bore disposed therethrough which the lower end of the mirror shaft may be securely retained. The lower clamping member preferably has a "living hinge" which enables the lower clamping member to pivot about the mirror shaft in a jaw-like manner. When the lower clamping member is in the open position, the mirror shaft may be inserted or removed therefrom, and when the clamping member is in the closed position the mirror shaft is securely retained therein.

In the preferred embodiment, the lower clamping member includes a latch having a male member and a female member. The male member of the latch is disposed on the cover portion of the clamping member, and the female member of the latch is disposed on the base portion of the clamping member. The top of the mirror shaft is securely retained between a longitudinal bore disposed within an upper clamping member, the upper clamping member being similar to the lower clamping member.

The bracket member is generally L-shaped. A first strut is disposed on one surface of the bracket member and a second strut is disposed on another surface of the bracket member. The mirror shaft is inserted and secured within the clamping member. The clamping member is mounted onto the bracket member, and the two struts are secured to the vehicle.

The two elongated anchors are cooperatively engaged with two sleeves which are medially disposed about the mirror shaft. One end of each anchor is securely affixable to the vehicle, and the second end of each anchor is securely affixable to the sleeves which encase the medial portion of the medial portion of the mirror shaft.

For a more complete understanding of the vehicle mounting assembly of the present invention, reference is made to the following detailed description and accompanying drawings in which the presently preferred embodiments of the invention are illustrated by way of example. As the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 2 depicts an assembly view of the mounting assembly depicted in FIG. 1;

FIG. 3 depicts the clamping member of FIG. 1 in an open position relative to the mirror shaft;

FIG. 4 is a perspective view of a second alternate embodiment of the mounting assembly of the present invention, depicting a base member and a cover member which secure the upper end of the mirror shaft to the back of the mirror, a pair of anchors medial to the mirror shaft, and a base member and a cover member which secure the lower end of the mirror shaft to the vehicle;

FIG. 5 is a perspective view of a third alternate embodiment of the mounting assembly of the present invention, depicting a clamping member which secures the upper end of the mirror shaft to the back of the mirror, a pair of anchors medial to the mirror shaft, and a clamping member and a mounting bracket which secures the lower end of the mirror shaft to the vehicle;

FIG. 6 depicts an assembly view of the mounting assembly depicted in FIG. 5;

FIG. 7 depicts a perspective view of the preferred embodiment of the clamping member shown in FIG. 1;

FIG. 8 depicts perspective view of the preferred embodiment of a clamping member, wherein the cover portion is latched to the base portion of the clamping member;

FIG. 9 is a perspective view of the preferred embodiment of the mounting assembly of the present invention, depicting the clamping member as shown in FIG. 8 securing the upper end of the mirror shaft to the back of the mirror, and another clamping member as shown in FIG. 8 securing the lower end of the mirror shaft to the vehicle;

FIG. 10 depicts an end view of the clamping member of FIG. 8, the cover portion being shown as unlatched from the base portion; and FIG. 11 depicts an end view of the clamping member of FIG. 8, the cover portion being shown as latched to the base portion, with the mirror shaft being disposed therein.

DETAILED DESCRIPTION OF THE PREFERRED EMBODIMENTS

Figure 1:
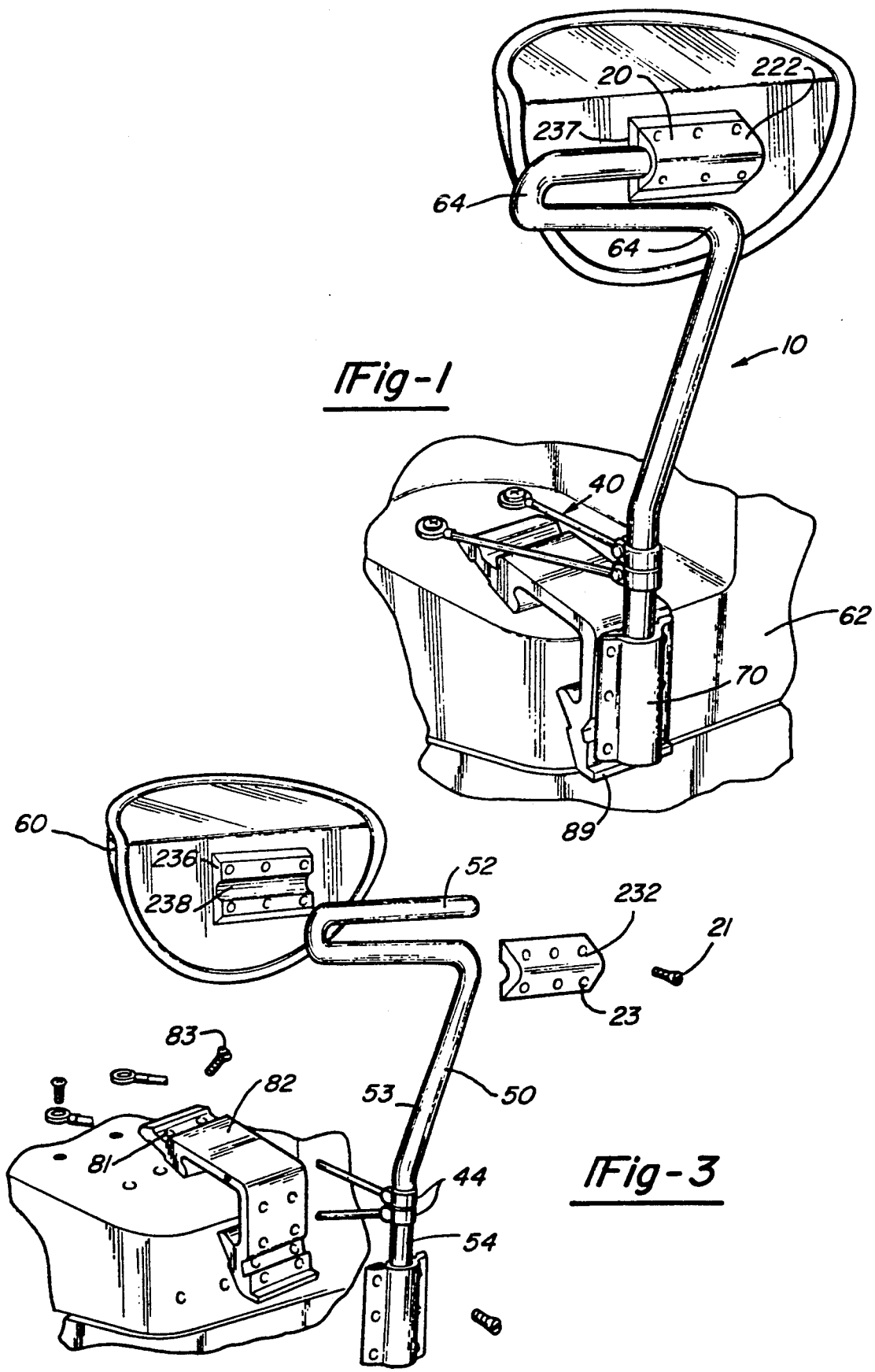
FIG. 1 is a perspective view of a first alternate embodiment of the mounting assembly of the present invention, depicting a base member and a cover member which secure the upper end of the mirror shaft to the back of the mirror, a pair of anchors medial to the mirror shaft, and a clamping member and a bracket member which secure the lower end of the mirror shaft to the vehicle.

Referring now to the drawings, FIG. 9 depicts the preferred embodiment of the mounting assembly 10 of the present invention. The mounting assembly 10 preferably includes a mirror shaft 50, a first clamping means 20 for securing the upper portion 52 of the mirror shaft 50 to the back of the mirror 60, means 40 for anchoring the medial portion 53 of the mirror shaft 50 to the vehicle 62, and a second clamping means 70 for mounting the lower portion 54 of the mirror shaft 50 to the vehicle 62.

The first clamping means 20 and the second clamping means 70 may be either (a) the clamping member 22 depicted in FIG. 7; (b) the clamping member 122 depicted in FIG. 8; or (c) a variation of the clamping member 124 disclosed in U.S. Pat. No. 4,500,063 entitled "Fender Mount for a Mirror", as hereinafter described.

The clamping member 22 of FIG. 7 has an open position (see FIG. 2) and a closed position. The clamping members of FIG. 7 and FIG. 8 are made either of a plastic material, such as polypropylene, aluminum, or of a high grade steel. The clamping member 22 has a first end portion 24 and a second end portion 26 and a center portion 25. In the closed position the end portions 24 and 26 are generally flat and the center portion 25 has a generally cylindrical shape.

The cover portion 32 of the clamping member 22 includes substantially one-half of the center portion 25 and substantially one-half of the first end portion 24. The base portion 36 of the clamping member 22 includes the other half of the center portion 25, the other half of the first end portion 24, and all of the second end portion 26.

The clamping member 22 has an open position and a closed position. In the closed position the end portions 24 and 26 are generally flat and the center portion 25 has a generally cylindrical shape. The longitudinal bore 38 disposed through the center portion 25 securely retains the upper end 52 of the mirror shaft. A plurality of apertures 23 are disposed in the first end portion 24 and in the second end portion 26 for cooperatively engaging with a plurality of fasteners 21 for mounting the clamping member 22 onto the back of the mirror 60, or to the bracket member 82. The clamping member 22 has a "living hinge" 29 which enables the clamping member 22 to pivotally open in a jaw-like manner, as the upper end 52 of the mirror shaft is engaged and disengaged therefrom. The longitudinal bore 38 disposed through the center portion 25 enables the mirror shaft 50 may be securely retained.

Alternatively, and as noted herein, the clamping member 22 may be used to mount the mirror shaft 50 onto the bracket member 82. The cover portion 32 of the clamping member 22 is rotatably disposed relative to the base portion 36 of the clamping member 22, enabling the mirror shaft 50 to be engaged and disengaged relative to the clamping member 22. The cover portion 32 is preferably disposed relative to the base portion 36 such that when the fasteners 21 are disengaged from only the aligned first end portion 24, the clamping member 22 is locked in the closed position and secured to the bracket member 82. However, when the fasteners 21 are removed from only the aligned second end portion 26, the cover portion 32 may open or close while the base portion 36 is secured to the bracket member 82.

The clamping means 20 and 70 may also be the clamping member 122 depicted in FIG. 8. The clamping member 122 has a cover portion 132 and a base portion 136, and the mounting surface of the base portion 136 is essentially flat. The clamping member 122 has an elongated bore disposed therethrough. The clamping member 122 has a "living hinge" 129, which enables the clamping member 122 to open and close as required. The clamping member 122 pivotally opens in a jaw-like manner enabling the mirror shaft 50 to be engaged and disengaged therefrom. The clamping member 122 has a latch 141. The male member 143 of the latch is preferably disposed on the cover portion 132 of the clamping member 136, and the female member 145 of the latch is preferably disposed on the base portion 136 of the clamping member 122.

The clamping means 20 and 70 may also comprise a variation of the clamping member disclosed in U.S. Pat. No. 4,500,063 entitled "Fender Mount for a Mirror" by W. P. Schmidt and F. D. Hutchinson, the disclosure of which is incorporated herein by reference. As shown in FIG. 1 the clamping member 222 includes a base portion 236 and a cover portion 232 secured to the upper portion 52 of the mirror shaft, or to the mounting bracket 82. The base portion 236 has a mounting surface 237 and an opposed outer surface 239. The cover portion 232 is secured to the outer surface 239 of the base portion 236.

The base portion 236 and the cover portion 232 together define a longitudinal bore 238 for securing the top end 52 of the mirror shaft therebetween. A plurality of apertures 21 are disposed in the base portion 236 and the cover portion 232 for cooperatively engaging with a plurality of threaded fasteners 23 for mounting the cover portion 232 onto the base portion 236, and the base portion 236 onto the back of the mirror 60. The cover portion 232 is adjustable relative to the base portion 236 to enable a repositioning of the mirror shaft 50 therebetween.

When the clamping means 20 or 70 is secured to a flat surface, (the bracket member 82 or the back of the mirror 60) a base portion 236 having a flattened mounting surface 237 is used (instead of the curved mounting surface as disclosed in U.S. Pat. No. 4,500,063). The clamping means 222 is preferably used to attach the mirror 60 to the mirror shaft 50. When the securing means 20 is used for attachment to a curved portion of the body of the vehicle 62, the mounting surface 237 of the base portion 236 has a general curvature which matches the curved portion of the vehicle 62.

The bracket member 82 (as shown in FIGS. 1 and 3 through 6) enables the second clamping means 70 to be mounted to the vehicle 62. The bracket member 82 is generally L-shaped. The bracket member 82 has two faces 84 and 86 which are generally normal to each other. The clamping means 70 is mountable onto the first face 84 of the bracket member, the first face 84 being preferably aligned in a vertical orientation. The bracket member 82 has a first strut 85 extending from the first face 84 and a second strut 87 extending from the second face 86. The first strut 85 and the second strut 87 each have a series of apertures 81 disposes therein, which enable a series of fasteners 83 to be inserted therethrough for secure attachment to the vehicle 62. The mirror shaft 50 is secured within the clamping means 70, and the clamping means 70 is mountable onto the bracket member 82.

The first strut 85 of the bracket member is affixable to a first part of the vehicle 62, and the second strut 87 of the bracket member preferably is affixable to a second part of the vehicle 62. The first face 84 of the bracket member 82 preferably has a flange extension 89 which is generally normal to the first face 84. The mirror shaft 50 is restable upon the flange extension 89.

The top portion of the mirror shaft is attached to the back of the mirror 60 (see for example FIG. 5). The mirror shaft 50 has a plurality of radical bends 64 therein, each of which is equal to or greater than a ninety degree arc. Proceeding away from the mirror 60, the mirror shaft 50 extends along a substantially horizontal plane and undergoes a double radical bend 64 (U-shaped), while still being substantially horizontal until the mirror shaft 50 crosses the proximate center of the mirror 60. The mirror shaft 50 then undergoes another radical bend 64 and thereafter is slanted inward and downward toward the vehicle 62 as the mirror shaft 50 approaches the second clamping means 70.

The center of gravity of the mirror 60 and the mounting assembly 10 preferably are disposed within the mirror shaft 50, which minimized the vibration of the mirror 60. The mirror 60 is positioned slightly to one side of the mirror shaft 50 to conpensate for the U-shaped portion of the mirror shaft 50, which is disposed on the opposite side of the mirror 60. Also, in some instances, it may be necessary to secure weights (not shown) onto the mounting assembly 10 to properly position the center of gravity within the mirror shaft 50.

The anchoring means 40 (see FIG. 1) coorerates with the balanced center of gravity of the mirror 60 and the mounting assembly 10 to further eliminate vibration of the mirror 60. The anchoring means 40 preferably includes two elongated anchors 42, each of which are cooperatively engaged with a cylindrical sleeve 44, which is disposed about the medial portion 53 of the mirror shaft 50. The upper end 46 of each elongated anchor 42 is securely affixable to the mirror shaft 50, and the lower ends 48 of the two elongated anchors 42 are securely affixable to two separatge parts of the vehicle 62.

Each of the two sleeves 44 have a tubular bore 47 through which the mirror shaft 50 is inserted. Both sleeves 44 have an extension 45, through which an aperture 41 is disposed. A fastener 43 is insertable through each sleeve aperture 41 to retain each sleeve 44 in a closed position about the mirror shaft 50. The upper end 46 of the first anchor is securely affixable to the first sleeve fastener 43, and the upper end 46 of the second anchor is securely affixable to the second sleeve fastener 43.

Although it is preferred that the mounting assembly 10 includes anchoring means 40 with two anchors 42 and two cooperating sleeves 44 for purposes of ballast, the mounting assembly 10 may contain any number of anchors 42 and sleeves 44 and the mounting assembly 10 may also be used without any such anchoring means 40.

In a first alternate embodiment as shown in FIGS. 1 and 2, the mounting asembly 110 is similar to the mounting assembly 10 of the preferred embodiment (FIG. 9.), except that the clamping means 70 which secures the lower end 54 of the mirror shaft to the vehicle 62 is the clamping member 22 depicted in FIG. 7, and the clamping means 20 which secures the upper end 52 of the mirror shaft 50 to the back of the mirror 60 is the clamping member 122 disclosed in U.S. Pat. No. 4,500,063 (see FIG. 2).

In a second alternate embodiment as shown in FIG. 4, the mounting assembly 110 is similar to the mounting assembly 10 of the preferred embodiment, except that the clamping means 70 which secures the lower end 54 of the mirror shaft to the vehicle 62 is the clamping member 122 disclosed in U.S. Pat. No. 4,500,063 (see FIG. 2), and the clamping means 20 which secures the upper end 52 of the mirror shaft 50 to the back of the mirror 60 is also the clamping member 122 disclosed in U.S. Pat. No. 4,500,063 (see FIG. 2).

A first cover member 32 is secured to a first base member 22 which is secured to the back of the mirror 60; and a second cover member 32 is secured to the second base member 22 which is mounted to the bracket member 82. The mounting surface 124 of the base member is secured to the bracket member 82, which provides additional ballast to the mounting assembly 110. The cover member 132 is secured to the outer surface 126 of the base member. A longitudinal bore 130 is formed between the base member 122 and the cover member 132, through which the lower end 54 of the mirror shaft 50 is retained. A plurality of apertures 121 are disposed in the base member 122 and the cover member 132 for cooperatively engaged with a plurality of fasteners 123 for mounting the cover member 143 onto the base member 122 and the base member 122 onto the bracket member 82. The cover portion 132 is adjustable relative to the base member 122 to enable a repositioning of the lower end 54 of the mirror shaft therebetween.

In a third alternate embodiment as shown in FIGS. 5 and 6, the clamping means 20 and 70 are both the clamping members 22 depicted in FIG. 7. In this embodiment, one clamping member 72 is secured to the bracket member 82, and a second clamping member 272 is secured to the back of the mirror 50.

FIG. 9 depicts the preferred embodiment of the mounting assembly 10 of the present invention, wherein the clamping member 122 of FIG. 8 securely retains the upper elongated section 52 of the mirror shaft 50 to the rear of the mirror 60, and the clamping member 122 of FIG. 8 securely retains the lower elongated section 54 of the mirror shaft 50 to the bracket member 82. FIG. 10 depicts an end view of the clamping member 122 of FIG. 8, the cover portion 132 being shown as unlatched from the base portion 136. FIG. 11 depicts an end view of the clamping member 122 of FIG. 8, the cover portion 132 being shown as latched to the base portion 136, with the mirror shaft 50 being disposed therein.

While the vehicle mounting assembly 10 has been described in conjunction with specific embodiments, it is evident that many alternatives, modifications, and variations will be apparent to those skilled in the art in light of the disclosure herein. It is intended that the metes and bounds of the invention be determined by the appended claims rather than by the language of the above specification, and that all such alternatives, modifications, and variations which form a function or conjointly cooperative equivalent are intended to be included within the spirit and scope of these claims.

We claim:

1. A mounting assembly for securing a mirror to a vehicle, the assembly comprising:
   (a) a mirror shaft having:
      (1) an upper portion;
      (2) a medial portion formed integrally with the upper portion and extending downward therefrom; and,
      (3) a lower portion formed integrally with the medial portion;
   (b) first means for clamping the mirror to the shaft;
   (c) means for anchoring the shaft to the vehicle, the means for anchoring comprising:
      (1) at least one cylindrical sleeve positionably adjustably disposed about the mirror shaft;
      (2) at least one elongated anchor, the at least one elongated anchor having an upper end and a lower end, the upper end securely affixed to the at least one sleeve, and the lower end being securely affixable to the vehicle;
   (d) a substantially L-shaped bracket member having a generally vertical first face and a generally horizontal second face, the first and second faces being substantially normal to each other, the bracket member being affixable to the vehicle; and
   (e) second means for clamping the shaft to the bracket member;
and wherein the mounting assembly minimizes vibration of the mirror.

2. The mounting assembly of claim 1 wherein the means for anchoring includes:
   (a) a first elongated anchor having an upper end and a lower end, the lower end of the first elongated anchor being securely affixable to a first section of the vehicle; the upper end of the first elongated anchor being securely affixable to the mirror shaft; and
   (b) a second elongated anchor having an upper end and a lower end, the lower end of the second elongated anchor being affixable to a second section of the vehicle, the upper end of the second elongated anchor being securely affixable to the mirror shaft.

3. The mounting assembly of claim 2, wherein the means for anchoring includes a first sleeve and a second sleeve, each sleeve having a tubular bore therethrough through which the mirror shaft may be inserted, each sleeve having an extension, an aperture being formed within each extension, fastening means being insertable through the sleeve apertures to retain the sleeves in a closed position about the mirror shaft, the upper end of the first anchor being securely affixable to the first sleeve, the upper end of the second anchor being securely affixable to the second sleeve.

4. The mounting assembly of claim 1 wherein:
   (a) the first means for clamping has a cover portion and a base portion, the base portion having a surface which is essentially flat, the first means for clamping having an elongated bore disposed therein in which the mirror shaft is securely retainable, the base portion of the first means for clamping having a mounting surface and an opposed outer surface, the cover portion of the first means for clamping being securable to the outer surface of the base portion, a plurality of apertures being disposed in the base portion and the cover portion for cooperatively engaging with fastening means for mounting the cover portion onto the base portion, the cover portion being adjustable relative to the base portion to enable a repositioning of the mirror shaft therebetween.

5. The mounting assembly of claim 1 wherein:
   (a) the first means for clamping has a cover portion and a base portion, the base portion having a surface which is essentially flat, the first means for clamping having an elongated bore disposed therein in which the mirror shaft is securely retained, the first means for clamping being movable between an open position and a closed position, the first means for clamping being pivotally movable in a jaw-like manner enabling the mirror shaft to be engaged in the bore, the first means for clamping further comprising fastening means for securing the cover portion to the base portion.

6. The mounting assembly of claim 1 wherein the first means for clamping comprises:
   (a) a cover portion;
   (b) a base portion, the base portion having a surface which is essentially flat, the first means for clamping having an elongated bore disposed therein in which the mirror shaft is securely retainable, the cover being movable between an open position and a closed position; and
   (c) a living hinge interconnecting the cover portion to the base portion, wherein the first means for clamping pivotally opens in a jaw-like manner about the hinge enabling the mirror shaft to be engaged in the bore; the first means for clamping having a latch, the latch including a male member and a female member, the male member of the latch being disposed on the cover portion of the first means for clamping and the female member of the latch being disposed on the base portion of the first means for clamping.

7. The mounting assembly of claim 1, wherein the mounting assembly comprises: a bracket member, the second means for clamping securable to the bracket member, the bracket member having a first strut and a second strut, the first strut being securable to a first portion of the vehicle and the second strut being securable to a second portion of the vehicle.

8. The mounting assembly of claim 1 wherein the first means for clamping comprises:
   (a) a base portion having a mounting surface and an opposed outer surface;
   (b) a cover portion securable to the outer surface of the base portion, the base portion and cover portion defining an elongated bore therebetween for securing the mirror shaft therewithin, a plurality of registering apertures are formed in the base portion and cover portion; and, (c) fastening means for mounting the cover portion onto the base portion through the registering apertures, the cover portion being adjustable relative to the base portion to enable a repositioning of the mirror shaft therebetween.

9. The mounting assembly of claim 1 wherein: the first means for clamping has a living hinge, the first means for clamping pivotally opening in a jaw-like manner about the hinge enabling the mirror shaft to be engaged and disengaged therefrom, the assembly further comprising fastening means for securably retaining the cover portion to the base portion.

10. The mounting assembly of claim 1 wherein: the first means for clamping has a living hinge, the first means for clamping pivotally opening in a jaw-like manner about the living hinge to enable the mirror shaft to be engaged and disengaged therefrom, the first means for clamping having a latch, the latch including a male member and a female member, the male member of the latch being disposed on the cover portion of the first means for clamping and the female member of the latch being disposed on the base portion of the first means for clamping.

11. The mounting assembly of claim 1: wherein the second means for clamping is securable to a bracket member, the bracket member having a first strut and a second strut, the first strut being securable to a first portion of the vehicle and the second strut being securable to a second portion of the vehicle.

12. The mounting assembly of claim 1, wherein the second means for clamping has an open position and a closed position, the second means for clamping having a living hinge, the clamping member pivotally opening in a jaw-like manner enabling the mirror shaft to be engaged and disengaged therefrom, the cover portion being securably retainable to the base portion in the closed position by a fastening means which is disposable therethrough.

13. The mounting assembly of claim 1, wherein the second means for clamping has an open position and a closed position, the second means for clamping having a living hinge, the clamping member pivotally opening in a jaw-like manner enabling the mirror shaft to be engaged and disengaged therefrom, the second means for clamping having a latch, the latch including a male member and a female member, the male member of the latch being disposed on one portion of the second means for clamping and the female member of the latch being disposed on the other portion of the second means for clamping.

14. The mounting assembly of claim 1 wherein:

(a) the upper leg of the upper portion of the mirror shaft is retainable within the first means for clamping, the first means for clamping having a cover portion and a base portion, the base portion having a surface which is essentially flat, the first means for clamping having an elongated bore provided therein in which the mirror shaft is securely retainable; and (b) the vertical leg of the lower portion of the mirror shaft is retainable within the second means for clamping, the second means for clamping having a cover portion and a base portion, the second means for clamping having an elongated shaft bore provided therein in which the mirror is securely retainable.

15. The mounting assembly of claim 1, wherein the bracket comprises:
a first strut and a second strut, the first strut being secured to the first face and being securable to a first portion of the vehicle, the second strut being secured to the second face and being securable to a second portion of the vehicle, the struts having apertures formed therethrough for receiving a means for fastening.

16. The mounting assembly of claim 1 wherein the second means for clamping comprises:
a clamping member mountable to the bracket member, the mirror shaft being positionable between the bracket and the clamping member, the clamping member being securely retainable to the vertical leg of the lower portion of the mirror shaft, the clamping member having a cover portion and a base portion, the clamping member having an elongated bore disposed therein through which the mirror shaft is securely retainable.

17. A bracket assembly for mounting a mirror shaft to a vehicle, the bracket assembly comprising:

(a) a bracket member, the bracket member being generally L-shaped, the bracket member having a first portion and a second portion, the first portion being generally normal to the second portion, the bracket member having a first strut disposed on the first portion and a second strut disposed on the second portion, the first strut being removably attachable to a first portion of a vehicle, the second strut being removably attachable to a second portion of the vehicle; and (b) a clamping member, the clamping member being removably mountable to the bracket member, the clamping member comprising a cover portion and a base portion, the cover portion and base portion cooperating to define a bore therebetween, the bore receiving a mirror shaft therewithin.

18. The bracket assembly of claim 17, wherein the clamping member comprises: a living hinge, the clamping member pivotally opening in a jaw-like manner about the hinge to enable the mirror shaft to be engaged thereby, the cover portion being securably retainable to the base portion in the closed position.

19. The bracket assembly of claim 17, wherein the clamping member, comprises: a living hinge, the clamping member pivotally opening in a jaw-like manner about the hinge to enable the mirror shaft to be engaged thereby, the clamping member having a latch, the latch including a male member and a female member, the male member of the latch being disposed on one portion of the clamping member and the female member of the latch being disposed on the other portion of the clamping member.

20. The bracket of claim 17, wherein: one of the portions of the bracket member defines the base portion of the clamping member.

21. The bracket of claim 17, wherein: the base portion of the clamping member is removably mountable to the bracket member.

* * * * *